INVENTORS
FREDERICK A. ZENZ
DANIEL McK. HUNTER
BY
ATTORNEY

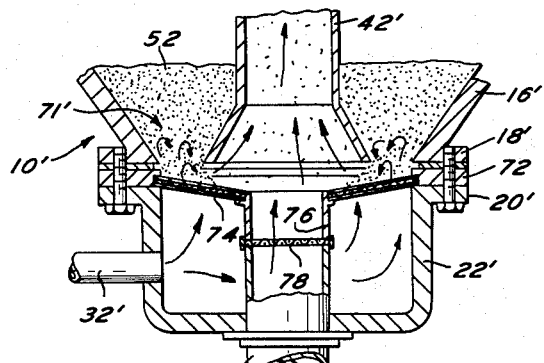
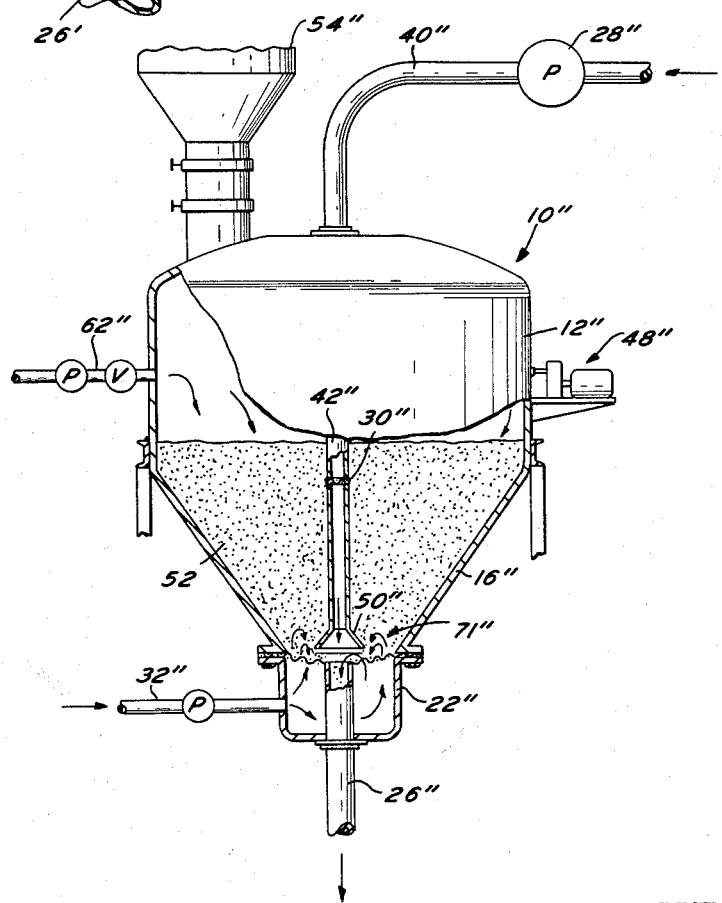

April 20, 1965  F. A. ZENZ ETAL  3,179,378
APPARATUS FOR MIXING AND TRANSPORTING FINELY DIVIDED SOLIDS
Filed Dec. 26, 1962  3 Sheets-Sheet 3

INVENTORS
FREDERICK A. ZENZ
DANIEL McK. HUNTER
BY
Arthur H. Seidel
ATTORNEY

United States Patent Office 3,179,378
Patented Apr. 20, 1965

3,179,378
APPARATUS FOR MIXING AND TRANSPORTING FINELY DIVIDED SOLIDS
Frederick A. Zenz, Roslyn Harbor, and Daniel McK. Hunter, Glen Cove, N.Y., assignors to The Ducon Company, Inc., Mineola, N.Y., a corporation of New York
Filed Dec. 26, 1962, Ser. No. 247,166
13 Claims. (Cl. 259—4)

This invention relates to an apparatus for transporting finely divided solids.

In particular, the apparatus of the present invention permits the transport of materials of widely varying particle size and density characteristics in either so-called dilute phase (high ratio of fluid to solids) or dense phase (low ratio of fluid to solids) without requiring mechanical or moving parts and without necessitating alterations to said apparatus. A principal feature of the present invention is to provide means for controlling the feed rate of solids into the conveying fluid stream and to permit the attainment of high feed rates continuously and in so fluidized a state as to permit a minimum in pressure and conveying fluid requirements, which in the handling of fine powders constitutes the desirable and economic region of conveying operation.

The internals of the present invention permit its use as a means of intimately blending in transit two or more particulate solids fed as individual grinds into the feeder vessel and also permit its use as a means of conveying the mixture either out of the top or out of the bottom of the vessel by simply opening or closing the appropriate valves.

The present invention overcomes the disadvantages of the prior art by using a separate fluidizing source to cause the finely divided solids to be fluidized only in the area of one end of an outlet pipe through which transport air is flowing. No excess pressure need be exerted above the effluxing bed of finely divided solids so that the solids are permitted to flow into the conveying line in a fluidized state intimately mixed with the conveying fluid and thereby exhibiting a low viscosity leading to relatively little friction with the pipe wall as opposed to flowing in the unaerated form of a highly viscous piston accompanied by excessive pressure losses.

It is an object of the present invention to provide a novel apparatus for transporting solids which has the capability of handling nearly any dry granular material no matter what its physical properties.

It is another object of the present invention to provide an apparatus for transporting fluidized solids which incorporates no mechanical moving parts during its operation.

It is another object of the present invention to provide a novel self-cleaning apparatus capable of handling a wide variety of solids having different angles of repose and different fluidizing velocities without necessitating mechanical changes.

It is another object of the present invention to provide a novel apparatus for transporting solids incorporating a simple control of the transport flowing density independent of the mainstream of conveying fluid.

It is still another object of the present invention to provide a novel apparatus for transporting solids which is adaptable to pneumatic as well as hydraulic transporting systems and also capable of an upward or downward discharge by simple manipulation of valves.

It is still another object of the present invention to provide a novel apparatus for transporting finely divided solids wherein excess pressure on the supply of the solids is not required and thus the operating pressure is kept to a minimum.

It is still another object of the present invention to provide a novel apparatus for transporting finely divided solids wherein they are fluidized at the point of entry into the conveying line and wherein their flow into the conveying line is continuous and uninterrupted so that line pressure loss due to flowing friction is also at a minimum thereby permitting operation with fluid compressors of the centrifugal and gear type not necessitating reciprocating machines which unavoidably otherwise admit oil and other undesirable contaminants which in many instances are incompatible with the particulate material being conveyed.

It is still another object of the present invention to provide a novel apparatus for transporting finely divided solids in which two or more such materials may be fed to and blended in the conveying line.

Other objects will appear hereinafter.

For the purpose of illustrating the invention, there is shown in the drawings forms which are presently preferred; it being understood, however, that this invention is not limited to the precise arrangements and instrumentalities shown.

FIGURE 2 is an enlarged detail view of another embodiment of the present invention.

FIGURE 3 is a partial vertical sectional view of another embodiment of the present invention.

FIGURE 4 is a sectional view of another embodiment of the present invention.

FIGURE 5 is a sectional view taken along the lines 5—5 in FIGURE 4.

FIGURE 6 is a partial isometric view showing internals of yet another embodiment of the present invention.

Referring to the drawing in detail, wherein like numerals indicate like elements, there is shown in FIGURE 1 one embodiment of the present invention designated generally as 10.

Figure 1:
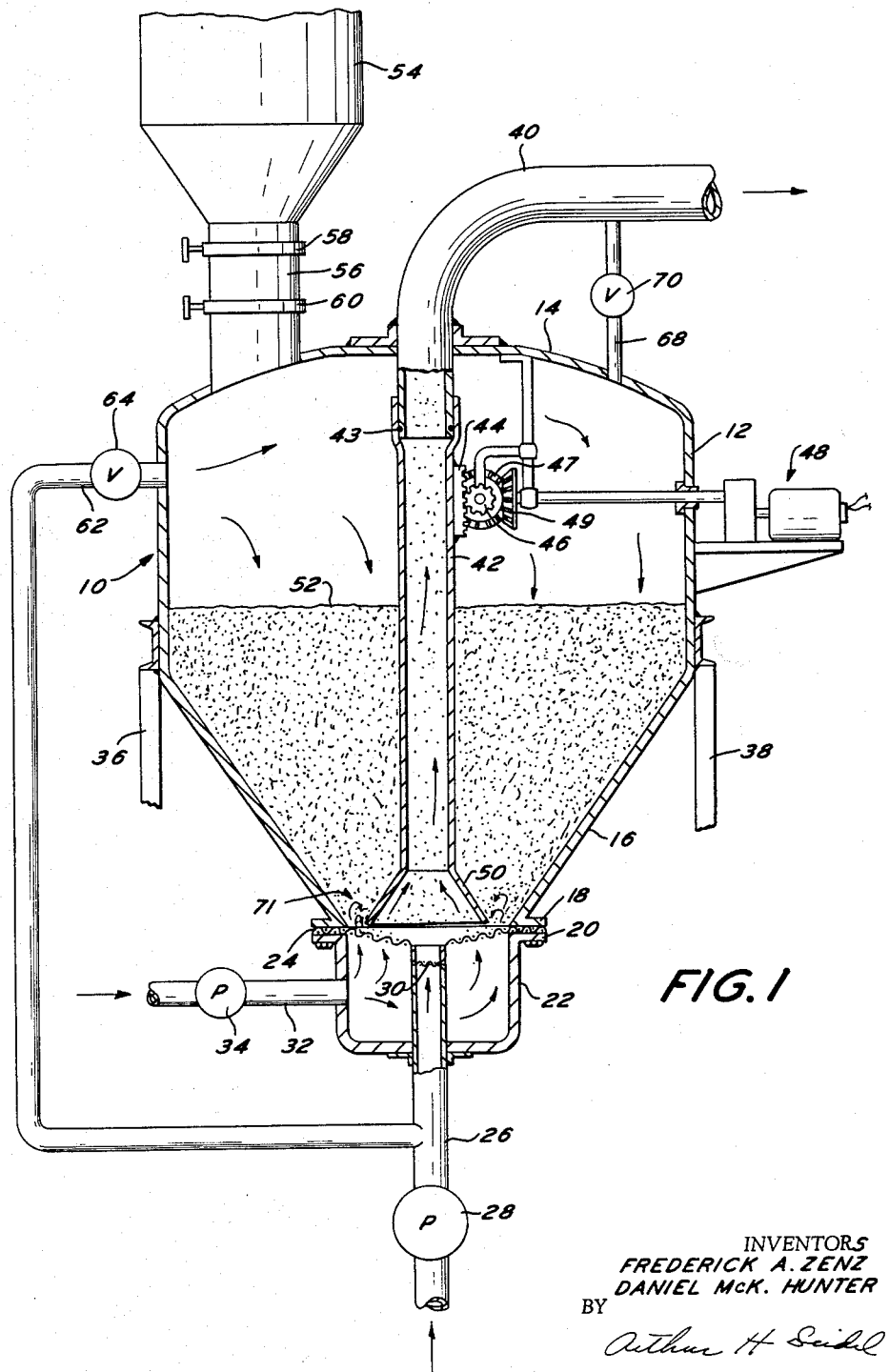
FIGURE 1 is a vertical sectional view of the apparatus in accordance with one embodiment of the present invention.

The apparatus for transporting solids 10 includes a cylindrical shell 12 having a top 14 and a conical base 16 terminating in a radially outwardly directed flange 18. The flange 18 is juxtaposed to a radially outwardly directed flange 20 at the open end of a cup-shaped housing 22. The flanges 18 and 20 are mechanically coupled together with a grid 24 disposed therebetween.

The grid 24 is preferably an annular ring of sintered metal. The aperture at the center of the annular grid 24 is in line with the outlet end on a pipe 26. The pipe 26 is adapted to be in communication with a source of a transport fluid such as pressurized air and may contain a pump 28 therein. The pipe 26 extends through the bottom wall of the cup-shaped housing 22 and may be provided with a grid or filter device 30 adjacent to its outlet end.

The grid 30 may be a screen, a sintered metal or plastic disc, or any other form of porous media affording good fluid distribution and having material characteristics compatible with the conveyed powder (e.g., stainless steel for foods and pharmaceuticals, etc.). As shown more clearly in FIGURE 1, the grid 24 is preferably dish-shaped and constitutes the top wall for the entire space between the side walls of the cup-shaped housing 22 and the outer peripheral surface of the pipe 26. A conduit 32 communicates with the interior of housing 22. Conduit 32 is coupled to a source of fluidizing air and may be provided with a pump 34 therein.

The cylindrical shell 12 may be provided with support members 36 and 38 to support the same above ground level. An outlet pipe 40 communicates with the interior of the housing defined by cylindrical shell 12, top wall 14 and conical base 16. The lower end of pipe 40 is provided with an inlet portion 42 telescoped thereover with an O-ring seal 43 therebetween. Portion 42 may be provided with a rack 44 in meshing engagement with a gear 46. Gears 46 and 47 are secured to a shaft which is rotated by meshing engagement of bevel gears 47 and 49. Gear 49 is secured to a shaft which sealingly extends through the cylindrical shell 12 and is coupled to a motor means 48. Motor means 48 is adapted to rotate gear 49 which in turn rotates gear 47 which rotates gear 46 thereby raising or lowering the flared inlet end 50 on the portion 42. The vertical disposition of the flared inlet end 50 with respect to the grid 24 is desirably adjustable as a function of the angle of repose of the finely divided solids 52. Hence, the apparatus 10 is adapted to handle a wide variety of finely divided solids having different angles of repose and different fluidizing velocities without necessitating mechanical changes.

The finely divided solids 52 are supplied from the hopper 54. A substantial amount of the finely divided solids 52 will be provided so that the finely divided solids 52 occupy a substantial volume but less than the volume of the housing of which the shell 12 is a part.

In order that the finely divided solids may be introduced into the shell 12 from the hopper 54, while the space above the finely divided solids is being pressurized, the outlet from the hopper 54 includes a trap chamber 56 between selectively operable valves 58 and 60. Pressurizing air may be introduced into the shell 12 above the surface level of the finely divided solids 52 by conduit 62 containing a selectively operable valve 64. When the apparatus 10 is functioning and finely divided solids are being transported through conduit 40, the pressurizing fluid on the surface of the finely divided solids may be augmented by partially opening valves 70 in conduit 68 so that the transport fluid may be recirculated into the space above the surface level of the finely divided solids.

The manipulation of valves 64 and 70 as a means of introducing air to the region above the solids 52 is concomitant with any desired means of operation. In normal practice valve 70 would remain shut and valve 64 be open to a source of pressure equal to that existing in line 26 at the point of entry of line 26 into the cup-shaped housing 22. This is most readily accomplished by simply connecting conduit 62 to line 26 at a point in line 26 between pump 28 and housing 22. Such a connection would obviate the need for a separate pump for conduit 62. Valve 70 would ordinarily remain closed. However, dependent upon the characteristics of the solids being conveyed, it can be used to permit a portion of the gas, entering housing 22 below grid 24, to escape up through the solids 52 and enter line 40 by passing through line 68 and valve 70. This small amount of gas may be controlled by valve 70 so as to possibly be sufficient to fluidize more of the mass of solids 52 lying in vessel 10 above element 50 and thus permit the solids to exert their full weight upon the annular area between element 50 and flange 18 thereby increasing the solids flow rate through said annular area and into the mainstream of transport air.

The operation of the apparatus 10 is as follows:

Finely divided solids 52 are introduced into the shell 12 and conical base 16. Fluid is introduced into the space above the finely divided solids through conduit 62. The finely divided solids do not enter the housing 22 since they cannot pass through the grid 24. A transport fluid flows through pipe 26, portion 42 and pipe 40. Fluidizing air is introduced into the housing 22 from conduit 32.

The fluidizing air passes upwardly through the grid 24 and fluidizes only that portion of the finely divided solids adjacent the lower edge of the inlet end 50. The area of the finely divided solids which is fluidized by the fluid from conduit 32 is designated as 71 in FIGURE 1.

It is presumed that the lowermost edge of the inlet end 50 has been spaced from the grid 24 by a distance dictated by the angle of repose and particle size characteristics of the finely divided solids, as well as by the area required for passage of the solids at their maximum desired transport rate.

The spacing of the lowermost edge of the inlet end 50 from the grid 24 and the radial distance between the lowermost edge of the inlet end 50 and the edge of the inlet conduit 26 will be so proportioned that the finely divided solids 52 will not flow into the inlet end 50 and conduits 26 and 42 whether or not transport fluid is flowing from pipe 26 through portion 42 to pipe 40. The grid 30 in pipe 26 prevents any finely divided solids from entering the same and the source of transport fluid. By varying the velocity issuing through grid 24, the degree of fluidity or fluidization of the solids lying on grid 24 beneath the element 50 can be controlled independent of the characteristics of the transport fluid. The transport fluid may be penumatic or hydraulic. If the finely divided solids 52 is comprised of two or more different types of solids, the same will be perfectly mixed and blended when being conveyed through pipe 40. The process may be batchwise or continuous. It will be noted that the grid 24 is slightly dish-shaped so as to permit the last portions of any finely divided solids in vessel 10 to flow off the grid into the mainstream of transport air issuing from conduit 26. In the fluidized state, the solids behave like liquids, having lost their characteristic static angle of repose, and thus flow off any slightly pitched surface. The apparatus 10 is thereby self-cleaning.

It will be noted that there are no mechanical moving parts when the apparatus 10 of the present invention is operating. Since the apparatus 10 uses a transport air and a separate fluidizing air, we have found that the apparatus 10 uses less power for any particular through-put as compared with devices proposed heretofore. Hence, the system is not only free from internal devices requiring oil, but also capable of being powered by air compressors of the non-reciprocating types thereby affording in many instances the handling of highly contaminant sensitive materials in an assuredly oil-free environment. The superior efficiency of the present invention stems from the fact that the fluidizing of the finely divided solids is accomplished only adjacent the flared inlet end 50 rather than attempting to fluidize the entire inventory of finely divided solids disposed within the shell 12 and conical base 16. The superior efficiency is also due to the continuity of solids fed into the transport air stream as an uninterrupted flowing fluidized mass unimpeded by large bubbles or voids characteristic of deep beds which otherwise would give rise to slugging conditions characterized by high pressure losses and pulsating flow. Alternate methods of conveying frequently rely on extruding the solids from the feed vessel, in what is sometimes referred to as piston flow, by applying pressure above the bed of material in the vessel 12. Such methods are less efficient because of the tremendous power requirements or pressure levels required as a result of the frictional resistance of both the flowing pistons of solids and the gas permeation through the interstices of the bed material.

In FIGURE 2, there is disclosed another embodiment of the present invention designated generally as 10'. The apparatus 10' is identical with the apparatus 10 except as will be made clear hereinafter. Accordingly, like elements are provided with primed numerals.

The grid in FIGURE 2 differs from the grid 24 in the apparatus 10. In the apparatus 10', the grid includes an annular ring 72 overlying the flange 20', a rubber gasket overlies the ring 72, and the flange 18' overlies the gasket. The ring 72 is connected at its inner peripheral surface to the outer peripheral surface of an annular grid comprising a screen disposed between two layers of a porous material such as canvas. The central portion of the grid is provided with an imperforate depending cylindrical wall 76 terminating at its lowermost end in a grid 78 which may be a sintered metal grid. The wall 76 and grid 78 are disposed in and sealingly juxaposed to the outlet end for the pipe 26'.

In all other respects, the apparatus 10' is identical to the apparatus 10. Accordingly, it is not deemed necessary to repeat the operation of the apparatus 10'.

In FIGURE 3, there is disclosed another embodiment of the present invention designated generally as 10". The apparatus 10" is identical with the apparatus 10 except as will be made clear hereinafter. Corresponding elements in the apparatus 10" are provided with double primed numerals.

The apparatus 10 was provided with a top discharge by way of pipe 40. In the apparatus 10", there is a bottom discharge as will be made clear hereinafter. Hence, the pipe 40" is adapted to be connected to a source of transport fluid. Portion 42 is adapted to be raised or lowered by motor means 48" as described above. Portion 42" is provided with a grid 30" to prevent the finely divided solids from entering the source of pressurized fluid.

A fluid medium entering the vessel 10" from the conduit 62" is adapted to equalize pressure on the finely divided solids 52. A fluidizing source is in communication with the housing 22" by way of conduit 32". Fluidizing air from conduit 32" fluidizes the finely divided solids in the zone 71". The pressure of the column of finely divided solids causes the fluidized solids to enter the pipe 26".

In each of the embodiments of the present invention, the vessel or housing defined by the cylindrical shell 12 and conical base 16 may be a reaction vessel in which the finely divided solids may be treated in any desired manner. The reaction time (residence time and solids concentration in vessel and transfer line) and discharge rate are capable of being readily controlled by controlling the velocity of the transport fluid flowing through pipes 26, 26', and 40". Close regulation of the fluidizing and transport fluids are easily attainable while using low pressure fluids.

In FIGURES 4 and 5, there is disclosed still another embodiment of the present invention designated generally as 80. The apparatus 80 is identical with the apparatus 10' except as will be made clear hereinafter.

The apparatus 80 is provided with a cup-shaped housing 82 having housing partition plates 84, 86, 88 and 90 dividing it into four equal chambers 83, 85, 87 and 89. It is to be understood that any number of such divisions are possible and the four in FIGURE 4 were chosen arbitrarily. Each of these chambers is provided with a valved air inlet conduit. The four conduits designated 91–94 lead from a common air source header. The arrangement in FIGURE 4 permits solids to be drawn from selected portions of the annular space surrounding element 95, or in other words from four separate regions above grid 96, by simply opening or closing any of the valves. The division of element 82 into separately controlled compartments aids in the selective mixing of materials leaving various portions of the vessel and also provides an additional control on the rate of solids feed into the conveying line. Opening only two of the valves would give half the solids flow resulting from opening four valves. Certain materials which exhibit extremely rapid change in fluid bed viscosity with aeration rate may require this means of controlling flow rate rather than relying upon extremely delicate control of total air rate through a single conduit 32 as in FIGURE 1.

In FIGURE 6, there is disclosed yet another embodiment of the present invention designated generally as 100. The apparatus 100 is identical with the apparatus 10 except as will be made clear hereinafter.

The apparatus 100 includes a vessel 102 provided with partition plates 104 and 106 dividing it into two halves. It is to be understood that any number of such divisions are possible, and the two in FIGURE 6 were chosen arbitrarily. Each half of the divided vessel 102 may be filled with a different material, it being desired to have a uniform mixture delivered at the discharge point of the conveying system. Upon admitting fluidizing air below the grid, material from either side of partition plates would feed simultaneously and result in a thorough blend delivered at the discharge point.

Conveying fluid is admitted to the space above the solids by valved branch conduits 110 and 112. If the apparatus of FIGURE 6 were combined with the structure of FIGURES 4 and 5, it would also be possible to change the proportions of either of the two or more solids sought to be blended.

The present invention may be embodied in other specific forms without departing from the spirit or essential attributes thereof and, accordingly, reference should be made to the appended claims, rather than to the foregoing specification as indicating the scope of the invention.

We claim:

1. Apparatus for fluidizing and transporting finely divided solids comprising a vessel having a conical base, a pipe having a flared end within said base, a dish-shaped grid juxtaposed to and spaced from said flared end, means for admitting fluid to an upper portion of said vessel, means for introducing finely divided solids into said vessel, means for introducing a fluidizing medium through said grid in an upwardly direction to fluidize only the portion of finely divided solids adjacent said flared end, and a second pipe having one end in line with and spaced from said flared end, whereby fluidized solids will mix with and be conveyed out of said vessel by a transport medium flowing through said first and second pipes.

2. Apparatus in accordance with claim 1 wherein the other end of said first pipe is in communication with a source of the transport medium.

3. Apparatus in accordance with claim 1 wherein the other end of said second pipe is in communication with the source of the transport medium.

4. Apparatus in accordance with claim 1 including means for selectively varying the distance between said grid and the lower edge of said flared end.

5. Apparatus in accordance with claim 1 wherein said grid is a sintered metal grid which permits air to flow therethrough while preventing finely divided solids from passing therethrough.

6. Apparatus in accordance with claim 1 including a valved conduit providing communication between said second pipe and an upper portion of said vessel.

7. Apparatus in accordance with claim 1 in which the rate of flow of solids into said first pipe is controlled by the total quantity of air fed through a portion of the grid.

8. Apparatus in accordance with claim 1 in which the vessel is divided into a plurality of sections each of which may be filled with a different solid material so that by proper control of the fluidizing air fed to the grid it is possible to control the absolute and relative rates of efflux of each of the different solids to accomplish the desired degree of mixing and deliver a homogeneous mix at the discharge end of the system.

9. In an apparatus for fluidizing finely divided particles comprising a vessel having a conical base, a pipe having a flared end within said base, a dish-shaped annular grid juxtaposed to and spaced from said flared end, the inner peripheral surface of said grid being connected to an imperforate cylindrical wall, a second grid within said cylindrical wall and remote from said first mentioned grid, means for introducing a fluidizing medium through said annular grid, a second pipe coupled to said cylindrical wall, and means for causing a transport medium to flow through said first and second pipes and said second grid, whereby fluidized solids will mix with and be conveyed out of said vessel by the transport medium flowing through said first and second pipes.

10. Apparatus in accordance with claim 9 wherein said first mentioned grid includes a screen sandwiched between two layers of canvas.

11. Apparatus in accordance with claim 9 wherein said first mentioned grid is a sintered metal.

12. Apparatus in accordance with claim 9 including means for varying the distance between the flared end and the first mentioned grid.

13. Apparatus in accordance with claim 9 including a valved conduit providing communication between said first pipe and an upper portion of said vessel.

References Cited by the Examiner
UNITED STATES PATENTS

| | | | |
|---|---|---|---|
| 1,054,629 | 2/13 | Warwick | 259—96 X |
| 1,535,991 | 4/25 | Crom | 302—53 |
| 2,795,533 | 6/57 | Drew | 302—53 X |
| 2,800,432 | 7/57 | Weinrich | 302—53 X |

WALTER A. SCHEEL, *Primary Examiner*.